June 1, 1954  W. S. SCOTT  2,679,913
ARTICLE OF MANUFACTURE AND METHOD OF MAKING SAME
Filed Dec. 9, 1949
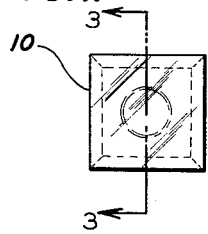
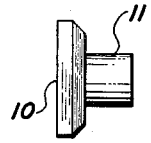
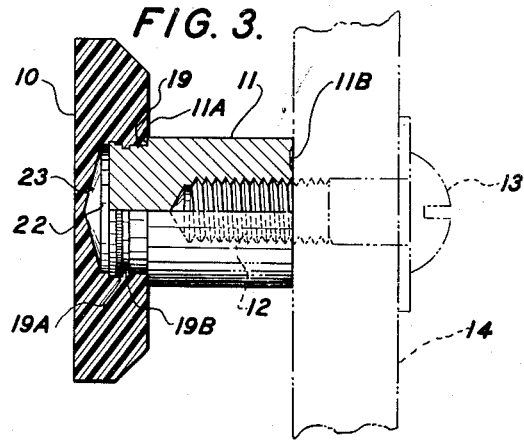
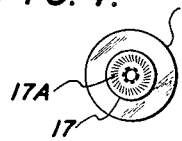
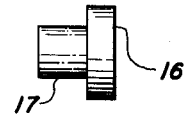
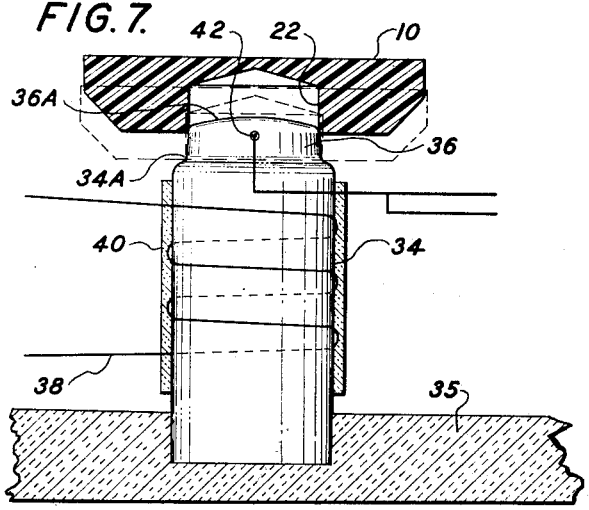
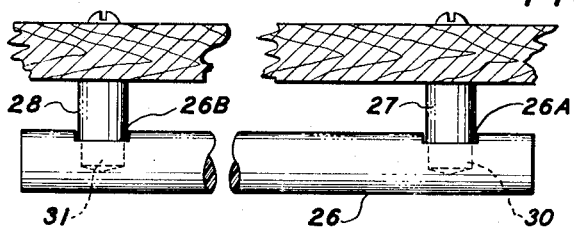
INVENTOR.
WALTER S. SCOTT
BY
James B. Christie
ATTORNEY Patented June 1, 1954

2,679,913

UNITED STATES PATENT OFFICE 2,679,913

ARTICLE OF MANUFACTURE AND METHOD OF MAKING SAME

Walter S. Scott, South Pasadena, Calif.

Application December 9, 1949, Serial No. 132,069

5 Claims. (Cl. 189—36.5)

This invention relates to a decorative article of manufacture, and more particularly, to hardware fixtures such as door knobs, drawer pulls, towel racks and the like, consisting of plastic knobs, bars and the like affixed to metal supports. The metal supports are adapted to be affixed to a drawer, wall, or door by screws or other means.

The invention thus contemplates novel plastic and metal fixtures incorporating an improved plastic to metal joint, a method for forming the improved joint, and an apparatus adapted for use in carrying out the method. A fixture in accordance with the present invention comprises a polished plastic member, preferably translucent or transparent and of any desired shape, the member having a cylindrical hole in one face, a metal stud having a reduced diameter section adjacent one end and separated from the remainder of the stud by an annular shoulder, the reduced diameter section being inserted and held in said hole so that the annular shoulder abuts against the outer edge of the hole and the inner end of the stud is spaced from the inner end of the hole.

The improved plastic to metal joint and the method of making the same take advantage of the property of certain thermoplastics to expand and contract under the influence of temperature changes. In accordance with the invention, the above-mentioned metal stud has a reduced diameter section adjacent one end which is preferably shallower than the hole in the plastic member in which it is to be inserted. Spaced from the end, this reduced diameter section is knurled or otherwise notched in a narrow annular band and an annular groove is formed in the reduced diameter section and preferably contiguous to the knurled band. The hole in the plastic member which is to receive the stud is formed slightly smaller in diameter than the reduced diameter section of the stud. To form the joint, the plastic member is heated immediately adjacent the hole while a spreading or expanding force is applied to the hole wall adjacent its outer end. After the hole has been enlarged in part in this manner, the metal stud is inserted to a depth determined by the length of the reduced diameter section thereof. As the plastic cools, it flows into the cavities in the knurled band and into the annular groove so that in the resultant joint, the stud is firmly held against rotary or longitudinal motion with respect to the plastic member.

I have also developed apparatus adapted to supply heat to a localized area of the plastic member adjacent the hole wall and to simultaneously exert an outward thrust on the wall. In one embodiment, this apparatus comprises a heat conductive post having a tapered tip which forms an annular shoulder with the body of the post and which has a domed end. The outer end of the tapered tip is of approximately the same diameter as the hole in the plastic member and tapers outwardly therefrom to the annular shoulder. Means are supplied for heating the post remote from the tip. To form the joint described above, the post is heated while the plastic member is supported on the tip which projects a short distance into the hole in the plastic member. As the plastic immediately adjacent the walls of the hole is heated, the hole is expanded by the weight of the plastic member on the tapered tip. The tip of the post is shorter than the depth of the hole corresponding approximately to the length of the reduced diameter section of the stud so that the hot metal does not contact the inner end of the hole. After the plastic member has settled over the tip to abut against the annular shoulder, it is removed and the metal stud is inserted in the hole in the above-described manner.

The invention will be more clearly understood with reference to the accompanying drawing wherein:

Fig. 1 is an end elevation of one type of fixture in accordance with the invention.

Fig. 2 is a side elevation of the fixture of Fig. 1.

Fig. 3 is a sectional elevation taken on the line 3—3 of Fig. 1 and showing one manner of attaching the fixture.

Fig. 4 is an end elevation of an alternative type of fixture.

Fig. 5 is a side elevation of the fixture of Fig. 4.

Fig. 6 is a top view of a third type of fixture; and

Fig. 7 is an elevation of apparatus employed in constructing the fixtures of the preceding figures.

Referring to the drawing, Figs. 1, 2 and 3 show a drawer pull or door knob in accordance with the invention in end elevation, side elevation and sectional elevation, respectively. The fixture comprises a plastic member 10 affixed on the end of a metal stud 11. The stud 11 is conveniently tapped at 12 to receive a bolt 13 extending through a drawer end or door 14.

In this embodiment, the plastic member 10 is preferably transparent and is square cut with the lower portion of each side being chamfered. This particular shape does not constitute a limitation of the invention but is selected only because of its attractive appearance. The knob shown in end elevation and side elevation in Figs. 4 and 5 illustrates an alternative shape wherein a cylindrical plastic member 16 is affixed on a cylindrical metal stud 17.

Fig. 3 best illustrates the manner in which the plastic member is affixed to the metal stud. It will be observed that stud 11 has a reduced diameter tip 19, a narrow band of which is knurled and which has a narrow annular groove 19B adjacent the knurled band 19A. The knurled band and groove are spaced from the end of tip 19 which forms a shoulder 11A with the main body of the stud 11. The plastic member 10 has a centrally disposed hole 22 in its lower face extending transversely toward the outer face of the member 10 and terminating in the member in a conical depression 23. The hole 22 is formed so as to have a diameter just smaller than the diameter of the tip 19 and to have a depth exceeding the length of the tip 19, so that when the member 10 is mounted over the tip 19 the end face of the stud will not abut against the inner end of the hole 22. To mount the plastic member 10 on the stud 11, the plastic immediately adjacent the outer edge of the hole 22 is heated while a spreading force is exerted thereon so as to temporarily expand the diameter of the hole. The stud 11 is immediately thereafter inserted in the hole to the point where the shoulder 11A abuts against the underface of the member 10. Upon cooling, the plastic surrounding the hole 22 contracts and flows into the cavities formed in the knurled band 19A and the annular groove 19B. In the resultant knob, it is impossible to twist or displace the members 10 and 11 with respect to each other.

In a preferred embodiment, the remote end of the stud 11 is provided with an annular knurled portion on its end face, evidenced by the cavity 11B in the drawing. Such a knurled band on the end face of the metal stud is shown more clearly in Fig. 4 wherein the end face of the stud 17 is provided with an annular knurled band 17A. The effect of this knurled band is to hold the stud against a receiving member, say the drawer end 14 (Fig. 3), impeding rotation of the stud with respect to the member.

Another form of the invention is shown in Fig. 6 wherein a plastic bar 26 is affixed to two studs 27, 28. The plastic bar 26 may be rectangular in section or cylindrical, as shown in the drawing. In the latter case, flats 26A, 26B are formed adjacent the ends of the bar and holes 30, 31 are formed in the bar extending inwardly from the flats 26A, 26B, respectively. The studs 27, 28 are anchored in the holes 30, 31 in the manner described with relation to Fig. 3. Obviously other types of fixtures can be constructed using a plastic member affixed on a metal stud. For example, a single stud affixed to the center of a comparatively short plastic bar provides an excellent fixture for use as a wash cloth rack.

A necessary requisite of the plastics to be used in the practice of the invention is that they be thermoplastic and adapted to contract on cooling. Preferably, I employ translucent or transparent plastics, as for example, the various acrylic resins, such as methyl methacrylate. In fabricating the fixture using methyl methacrylate I have found that the temperature to which the plastic is heated in the localized area surrounding the hole should lie in the range 240° to 260° F. Temperatures below this range are insufficient to accomplish the desired purpose and temperatures above this range are apt to produce striations or fractures in the plastic which spoil the finish of the finished article.

In Fig. 7 I have shown one means of heating the plastic in a localized area and at the same time expanding the walls of the hole. The apparatus of Fig. 7 comprises a heating conductive post 34, say of aluminum or other metal, rigidly mounted in an upright position in an insulating base 35. A tip 36 is formed on the upper end of the post 34 and is of smaller diameter than the main body of the post, forming an annular shoulder 34A therewith. The tip 36 is frusto-conical in shape and may have a domed end 36A. The diameter of the extremity of the tip 36 is approximately that of hole 22 in plastic member 10, assuming that the apparatus of Fig. 7 is used as an aid in construction of the fixture shown in Fig. 3. A heating coil 38 is wrapped around the body of the post and is covered by a layer of insulation 40 to reduce heat loss from the post. A thermocouple 42 is imbedded in the tip 36 providing means for ascertaining and maintaining the temperature of the tip within the desired range. Conveniently, the thermocouple is connected through means well known in the art to the energy source for coil 38 so that temperature control is automatic.

In use, the plastic member 10 is positioned over the tip 36 so that the end of the tip projects into the hole 22. The post is heated to a temperature in the above specified range or to a suitable temperature which may be different from that specified above in the event other types of plastics are used. As the plastic immediately adjacent hole 22 is heated, the walls of the hole are deformed over the tip 36 solely by the weight of the plastic member itself. When the plastic member has settled to the position shown in dotted lines in Fig. 7 so that the outer edges of the hole 22 abut against the shoulder 34A, the plastic member is immediately lifted from the tip 36 and the appropriate metal stud is inserted therein in the manner described in relation to Fig. 3. It is highly important that the end of the tip 36 does not touch the bottom of hole 22 in the plastic member 10 for the effects of heat on the bottom of the hole destroy the transparency of that portion of the plastic.

It is not essential that the hole in the plastic member which is to receive the metal stud have a conical bottom. However, such construction greatly improves the appearance of the finished product for it has the effect of making the polished end of the metal stud appear as though formed by a number of separate adjoining facets. By this simple expedient of forming a conical bottom on the hole in the plastic member, a light-reflecting effect is achieved which could otherwise be accomplished only by careful grinding of the end of the metal stud.

I have provided a highly attractive plastic and metal fixture which has innumerable potential uses as door knobs, drawer pulls, towel racks, etc., and which is rugged and durable by reason of an improved method of joining plastic to metal, which method also forms a part of the invention.

I claim:

1. An article of manufacture comprising a translucent plastic member having a cylindrical bottomed hole of uniform diameter in one face thereof, a metal stud, the stud having a reduced diameter section adjacent one end forming an annular shoulder between said reduced diameter section and the remainder of the stud, the said reduced diameter section of the stud being shorter than the depth of the hole in the plastic member and being disposed therein so that said shoulder abuts the outer edge of the hole and the end face of the stud is spaced from the inner end of the hole so that there is no plastic to metal contact of said end face of the stud, the stud being held in the hole by deformation of the plastic.

2. An article of manufacture comprising a translucent plastic member having a cylindrical bottomed hole of uniform diameter in one face thereof, the hole having a concave inner end, a metal stud, the stud having a reduced diameter section adjacent one end forming an annular shoulder between said reduced diameter section and the remainder of the stud, the said reduced diameter section of the stud being shorter than the depth of the hole in the plastic member and being disposed therein so that said shoulder abuts the outer edge of the hole and the end face of the stud is spaced from the concave inner end of the hole so that there is no metal to plastic contact at said end face of the stud, the stud being held in the hole by deformation of the plastic.

3. An article of manufacture comprising a translucent plastic member having a cylindrical bottomed hole of uniform diameter in one face thereof, the hole having a conical inner end, a metal stud, the stud having a reduced diameter section adjacent one end shorter than the depth of the hole in the plastic member and forming an annular shoulder between said reduced diameter section and the remainder of the stud, said reduced diameter section of the stud being provided with a narrow knurled band spaced from the end of the stud and an annular groove contiguous to the band and on the side of the band opposite the said end of the stud, the said reduced diameter section of the stud being disposed in said cylindrical hole so that said shoulder abuts the outer edge of the hole and the said end face of the stud is spaced from the conical inner end of the hole so that there is no metal to plastic contact at said end face of the stud, the stud being held in the hole by deformation of the plastic into said knurled band and annular groove.

4. A method of joining a translucent plastic member to a metal stud without marring the surfaces of the plastic member which comprises drilling a bottomed hole in one face of the plastic member and of a diameter just less than the diameter of an end of the stud, inserting a heated post part way into the hole to soften and expand the walls of the hole, withdrawing the post and immediately inserting said one end of the stud only part way into the hole to leave a space between the end of the stud and the entire inner end of the hole so that there is no metal to plastic contact at the inner end face of the stud, and allowing the plastic to cool and contract to grip the stud.

5. A method of joining a translucent plastic member to a metal stud without marring the surfaces of the plastic member which comprises drilling a hole in one face of the plastic, the hole having a concave inner end, forming the stud with a reduced diameter section adjacent one end to leave an annular shoulder between said reduced diameter section and the remainder of the stud, the reduced diameter section being of just greater diameter than the diameter of the hole and being shorter than the depth of the hole, inserting a heated post of frusto-conical shape part way into the hole to soften and expand the walls of the hole and so that the end of the post does not contact the inner end of the hole, withdrawing the post and immediately inserting the reduced diameter end of the stud into the hole with the annular shoulder of the stud engaging against the surface of the plastic around the open end of the hole whereby there is no plastic to metal contact at the inner end face of the stud, and allowing the plastic to cool and contract to grip the stud.

References Cited in the file of this patent

UNITED STATES PATENTS

| Number | Name | Date |
|---|---|---|
| 804,843 | Hewitt | Nov. 21, 1905 |
| 1,142,820 | Knauff | June 15, 1915 |
| 1,165,680 | Knauff | Dec. 28, 1915 |
| 1,193,434 | Sharpneck | Aug. 1, 1916 |
| 1,639,159 | Anderson | Aug. 16, 1927 |
| 1,693,838 | Faudi | Dec. 4, 1928 |
| 1,880,571 | Wellman | Oct. 4, 1932 |
| 1,919,455 | Wilson | July 25, 1933 |
| 2,129,257 | Bachmann | Sept. 6, 1938 |
| 2,177,191 | Sandberg | Oct. 24, 1939 |
| 2,243,549 | Yocom | May 27, 1941 |
| 2,295,075 | Burrows et al. | Sept. 8, 1942 |